May 30, 1950  R. W. JENSEN  2,509,504
COOLER FAILURE AUTOMATIC BY-PASS VALVE
Filed Nov. 6, 1945  4 Sheets-Sheet 1
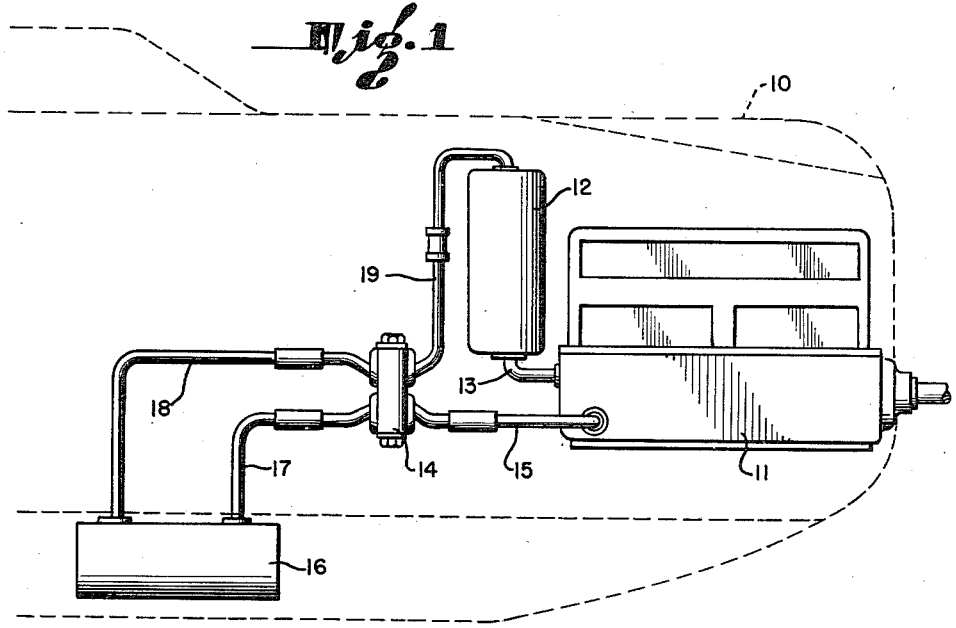
Fig. 1
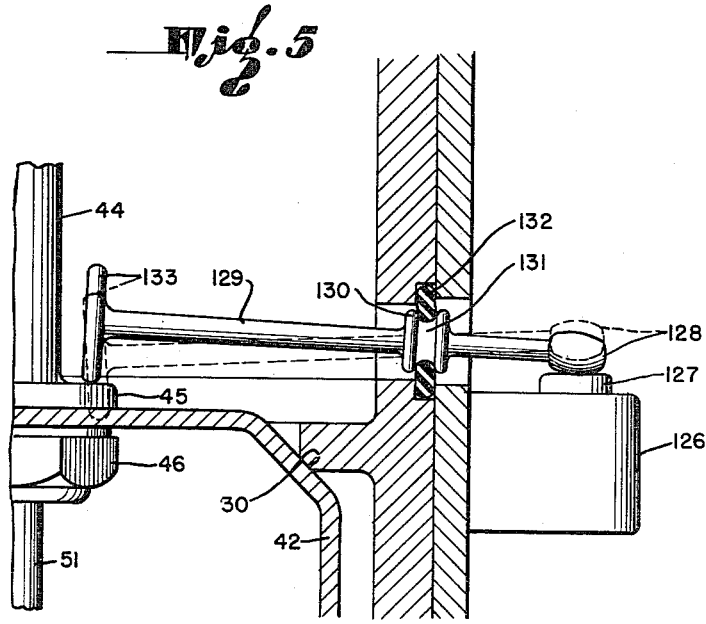
Fig. 5
INVENTOR.
RAYMOND W. JENSEN
BY
ATTORNEY May 30, 1950

R. W. JENSEN 2,509,504

COOLER FAILURE AUTOMATIC BY-PASS VALVE

Filed Nov. 6, 1945

INVENTOR.
RAYMOND W. JENSEN
BY
ATTORNEY

May 30, 1950 R. W. JENSEN 2,509,504
COOLER FAILURE AUTOMATIC BY-PASS VALVE
Filed Nov. 6, 1945 4 Sheets-Sheet 3

INVENTOR.
RAYMOND W. JENSEN
BY
ATTORNEY

May 30, 1950 — R. W. JENSEN — 2,509,504
COOLER FAILURE AUTOMATIC BY-PASS VALVE
Filed Nov. 6, 1945 — 4 Sheets-Sheet 4

INVENTOR.
RAYMOND W. JENSEN
BY
ATTORNEY

Patented May 30, 1950

2,509,504

UNITED STATES PATENT OFFICE 2,509,504

COOLER FAILURE AUTOMATIC BY-PASS VALVE

Raymond W. Jensen, Los Angeles, Calif., assignor to The Garrett Corporation, Airesearch Manufacturing Company division, Los Angeles, Calif., a corporation of California Application November 6, 1945, Serial No. 626,951

13 Claims. (Cl. 137—144)

This invention relates generally to fluid circulating systems and relates more particularly to means for controlling the circulation of lubricating oil in the oil circulating system of internal combustion engines, such as are used in aircraft. In systems of this character it is a generally accepted practice to provide the engine with an oil circulating system having an oil temperature regulator usually in the form of an oil cooler. Such oil circulating systems generally include a tank connected with the engine, an oil cooler to which hot oil flows from the engine, and a connection for conveying the oil from the cooler to the tank.

When oil is circulating through this system under the usual operating conditions and all the parts of said system are intact so that there is no leakage, the operating conditions may be considered as normal.

Should a leak occur in the cooler, engine failure may quickly result, due to the loss of oil from the system, and it is an object of the present invention to provide means which will prevent such loss of oil and engine failure in case a leak occurs in the cooler.

While the invention has utility in various types of installations, it is extremely useful when installed on fighter planes of the single engine type where danger of damage to the cooler is particularly great when such planes are engaged in combat.

Due to the use of bullet-proof and leak-proof tanks and lines, the most vulnerable part of the present day oil circulating system is the cooler and damage to said cooler from gun fire could easily result in the loss of the oil in the oil circulating system within a few minutes. In such a situation the pilot's hope of survival frequently depends upon keeping the engine running.

In the present invention the means for preventing the loss of the oil in the oil circulating system comprises automatically controlled bypass valve means so located in the system as to bypass the cooler in case the latter is so injured as to leak oil.

In order to insure prompt and automatic actuation of the bypass valve in case of cooler leakage, means are provided anterior and posterior to the cooler which will create a differential of pressure and normally each of said differential of pressures is of substantially the same value, at which time no bypassing occurs. However, should a leak occur in the system between the pressure differential creating means, one of the differential pressures will become of a different value relative to the other, whereupon the device functions to effect bypassing the injured portion of the oil circulating system.

Still another object of the invention is to provide an arrangement of the above character wherein the means for creating the differential of pressures comprises orifices located in selected portions of the oil line. Check valves may also be employed in connection with the orifices.

A further object of the invention is to provide a device of this character wherein there is means sensitive to said differential pressures for controlling the bypass valve, said means comprising a servo-valve controlled by the above mentioned differential of pressures, said servo-valve being adapted to move to a position for effecting positioning of the bypass valve for bypassing the injured section of the circulating system, when said differential pressures become unbalanced.

A still further object of the invention is to provide a device of this character wherein the bypass valve is moved to its operative position by the pressure of oil in a selected region of the oil system having the desired oil pressure therein, said servo-valve being adapted to admit the oil pressure into a chamber or the like within which a portion of the bypass valve is adapted to operate when the differential of pressures in one portion of the system varies from that in the other portions of the systems.

When bypassing of the cooler occurs, the oil temperature will rise and it is desirable to apprise the pilot of the situation. It is therefore another object of the invention to provide means for warning the pilot or operator of the plane, when the bypass valve becomes operative to bypass oil about the cooler, that high oil temperatures may be expected, said means, in the present instance, comprising an electric light which is controlled by a switch actuated by the bypass valve.

Further objects and advantages of the invention will appear in the following part of the specification.

Referring to the drawings, which are for illustrative purposes only:

Figure 1 shows the outline of a portion of an airplane and schematically shows an engine and oil circulating system therefor embodying the present invention;

Figure 5 is an enlarged diagrammatic sectional view of the switch means for controlling the warning signal.

Figure 2:
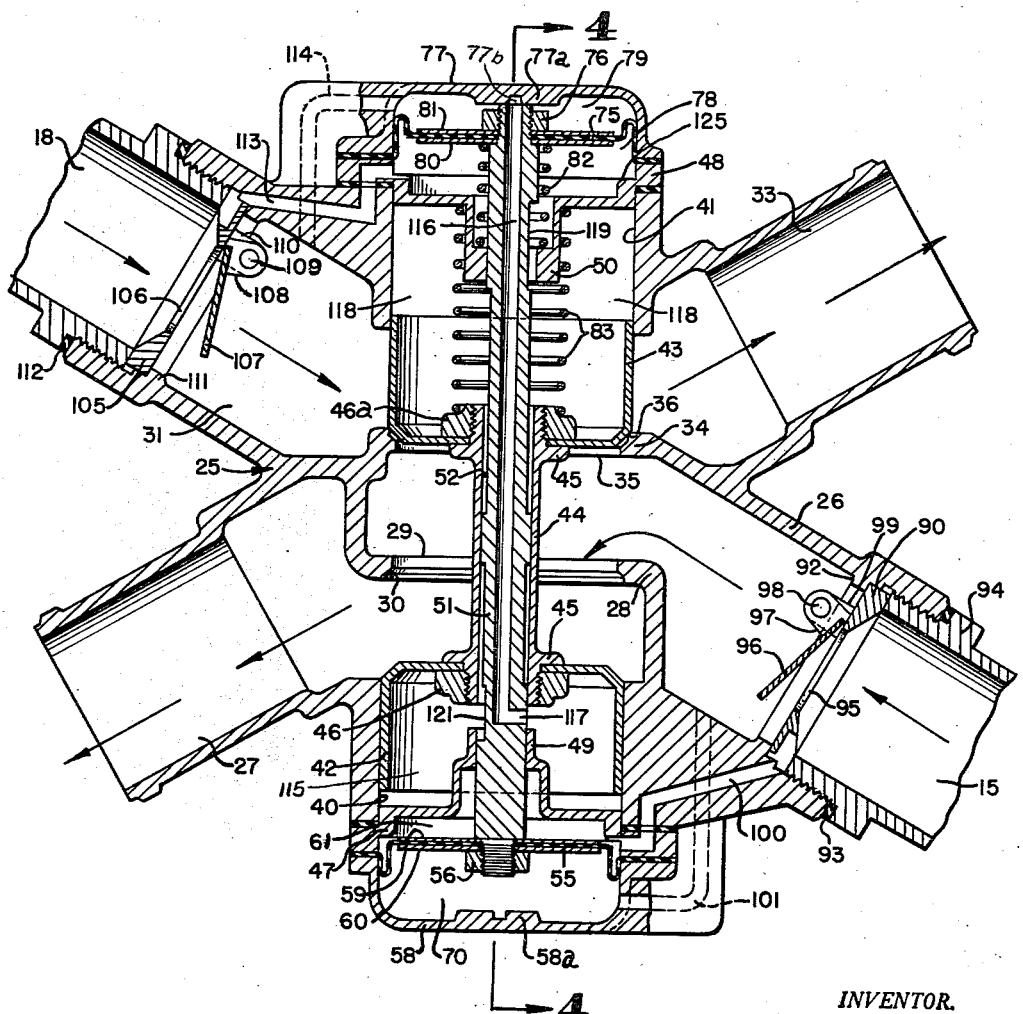
Figure 2 is a diagrammatic sectional view of a bypass valve embodying the present invention, the respective parts being shown in the normal position.

Referring to Figure 1, a portion of an airplane is shown by the dotted line 10. Within the airplane is an engine 11 which has an oil circulating system comprising a reservoir or tank 12 connected with the engine by a conduit 13 for supplying same with oil, and a bypass valve 14 connected with the engine by a conduit 15 for conveying returning oil through the bypass valve to an oil conditioning device or cooler 16 which is connected with the bypass valve by a conduit 17. Oil leaves the cooler by way of a conduit 18 which has a connection with the bypass valve 14 and conditioner oil is conveyed from the bypass valve to the tank 12 by a conduit 19. Normally the oil from the tank passes to the engine and from there to the cooler by way of valve 14, thence to the valve 14 and then to the tank. Should the cooler become injured to such an extent as to leak oil, the bypass valve automatically functions to cause the oil to bypass the cooler so that said oil flows from the tank, to the engine, to the bypass valve and back to the tank.

Figure 4:
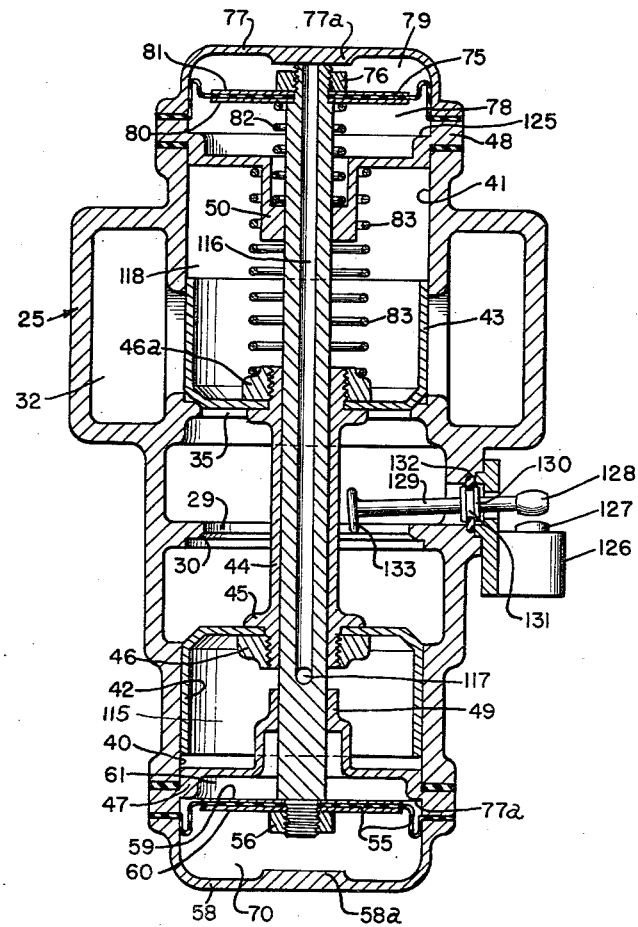
Figure 4 is a sectional view taken on line 4—4 of Figure 2.

Referring to Figure 2, the bypass valve is shown as comprising a casing 25 having a hot oil inlet conduit 26 which is connected to the conduit 15 conveying oil from the engine. The casing also has an outlet passage 27 to which the conduit 17 is connected. A partition 28 is interposed between the passages 26 and 27 and includes a central, substantially horizontal, portion, as shown in the drawings, having opening 29 with a valve seat 30. The cooler return conduit 18 is connected with a second inlet conduit 31 in the casing 25, the conduit 31 communicating with an annulus portion 32, Figure 4, which in turn is connected with a second outlet 33, the latter being connected to the conduit 19 leading to the supply tank 12. A partition 34 having a portion substantially parallel to the central horizontal portion of the partition 28, separates the passage 26 from the annulus 32 and is provided with an opening 35 having a valve seat 36. Openings 29 and 35 with their valve seats 30 and 36 are in substantially axial alignment. Adjacent the respective ends of the casing 25 are cylinders 40 and 41 within which cup-shaped valves 42 and 43, respectively, are adapted to reciprocate. These valves are connected together in spaced relationship with each other by a sleeve 44 having flanges 45 adjacent the respective ends thereof. The respective valves 42 and 43 have openings in their bottom walls which receive threaded portions of said ends of the sleeve and said walls are secured between the respective flanges 45 by nuts 46 and 46a threadedly received on said threaded ends of said sleeve. The outer ends of the cylinders 40 and 41 are closed by cap-like members 47 and 48 which have guides 49 and 50 arranged centrally thereof and facing each other. Slidable within said guides is a servo-valve 51 which is also slidably disposed within a bore 52 of the sleeve 44, said guides and bore being in substantially axial alignment with each other.

Means for controlling the servo-valve includes a diaphragm 55 attached to the lower end of said valve, as shown in the drawings, by a nut 56 threadedly received on a reduced end portion of said valve 51. The diaphragm is marginally clamped between the cap 47 and a cup-like closure 58 which is attached to the assembly by any suitable means such as screws, not shown. The central portion of the diaphragm is reinforced by washer-like plates 59 and 60 disposed on opposite sides thereof, said diaphragm forming a movable wall between chambers 61 and 70 on opposite sides thereof. A second diaphragm 75 is secured to the upper end of the valve 51 by a nut 76 threadedly received on a reduced end portion of said valve. Diaphragm 75 is marginally secured between the cap 48 and a closure 77 and forms a flexible movable wall between chambers 78 and 79. Washers or plates 80 and 81 disposed on opposite sides of the diaphragm centrally reinforce the same. A light spring 82 reacts between the cap 48 and washer or plate 80 for urging the servo-valve 51 upwardly, as shown in the drawing, to its normal position, there being a relatively strong spring 83 which has a portion disposed about the guide 50 and which reacts between the cap 48 and nut 46a to urge the valves 42 and 43 to the normal position, shown in Figure 2, wherein the valve 42 is spaced from the valve seat 30 to permit the flow of oil through the opening 29 and valve 43 is in engagement with the valve seat 36 for closing the opening 35. With the valve and its various parts in the normal position (Fig. 2), the normal operation of the system occurs, the oil flowing under the usual or normal conditions from the engine to the cooler and thence to the reservoir or tank 12 which supplies the engine with oil through the conduit 13.

Means for creating a differential of pressure between the valve and the engine is provided, and, as shown, comprises a restriction having a body portion 90 which is shown as being adjacent the inlet end of conduit 26 and is secured between a flange 92 within conduit 26 and the adjacent end of the conduit 15 which is threadedly connected with the inlet end of said conduit 26, a gasket 93 being provided between an external shoulder 94 on conduit 15 and the adjacent end of conduit 26. The body 90 of the restricting means is provided with an orifice 95 which is controlled by a valve, shown as comprising a flap valve member 96 having an ear 97 adjacent the top which is pivoted at 98 to a supporting ear 99 attached to the body 90. The valve 96 is located on the downstream side of the orifice 95 and functions as a check valve to prevent the flow of oil from the bypass valve toward the engine. Oil from the engine, upstream of the orifice 95, is adapted to flow into chamber 61 by way of a passage 100 in the body 25 of the valve and in the cap 47. A passage 101 in the body of the valve and cap 58 connects the chamber 70 with the conduit 26 adjacent the downstream side of the restricting means or orifice 95. Similar valve-controlled restricting means is provided in the line of flow of oil from the cooler to the bypass valve and comprises a disk-like body member 105 having an orifice 106 therein controlled by a check valve including a movable member 107 having an ear 108 pivoted at 109 to an ear 110 attached to the member 105. The body member 105 is secured between an internal flange 111 in the conduit 31 and the adjacent end of the conduit 18 which is threadedly connected with the conduit 31, a gasket 112 providing a seal between the conduit 18 and the inlet end of the conduit 31. A connection or conduit 113 connects chamber 78 with the oil line adjacent the up-stream side of the orifice 106 and a conduit 114 connects chamber 79 with said oil line adjacent the downstream side of the orifice 106.

It is to be noted in Figure 2 that the upper end of the servo-valve 51 is in its uppermost position, the upward movement of said valve being limited by engagement of said upper end with a shoulder 77a of the cap 47, there being a slot 77b in said shoulder forming a connection between the chamber 79 and the adjacent end of a passage 116 which extends longitudinally of the valve 51 and has an outlet port 117 adjacent its opposite end which is in normal communication with a chamber 115 located within the valve 42 and cylinder 40. Thus the passage 116, together with the slot 77b and port 117, forms a connection between the chamber 79 and the chamber 115. That is, under normal operating conditions, when the cooler is functioning in the usual manner, the chamber 79 is in communication with chamber 115. The chamber 78 is at all times in communication with a chamber 118 within the valve 43 and cylinder 41, there being a relieved section 119 in said servo-valve 51 to provide a passage within the guide 50, between said chamber 78 into the chamber 118. Communication between chamber 61 and chamber 115 is at times provided by a relieved portion 121 of said valve 51, as will be hereinafter more fully described.

It is believed that the operation of the device will be better understood if a concrete example of oil pressures is used, said pressures being merely by way of example only, and it is to be understood that different pressures may prevail through the system although said pressures have certain relationships to each other, as will be apparent from the description which follows:

Assume that the pressure on the upstream side of the orifice 95 is 15 pounds, and that there is a drop of 2 pounds in pressure across the orifice so that on the downstream side of said orifice the pressure is 13 pounds. Assume further that the normal pressure on the upstream side of the orifice 106 is 5 pounds and that there is a similar drop in pressure across the orifice 106, that is, the drop in pressure is 2 pounds. Thus the pressure downstream of the orifice 106 is 3 pounds.

Under normal conditions of operation the 15 pounds pressure upstream of the orifice 95 is transmitted to the chamber 61 and the 13 pounds pressure downstream of the orifice 95 is communicated to the chamber 70. Further, the 5 pounds of pressure upstream of the orifice 106 is communicated to the chamber 78 and the 3 pounds of pressure downstream of said orifice is communicated to the chamber 79. Thus it will be apparent that the pressures urging the servo-valve 51 in opposite directions will be in balance, that is, the 13 pounds of pressure in the chamber 70 which acts on the diaphragm 55 and urges the valve 51 upwardly combined with the 5 pounds pressure in chamber 78 urging the valve in the same direction, equal 18 pounds. Likewise, the 15 pounds pressure in the chamber 61 acting on the diaphragm 55 and urging the valve downwardly and the 3 pounds of pressure in the chamber 79 urging the valve in the same direction, also equals 18 pounds. With the oil pressures in balance, the light spring 82 will effect movement of the valve 51 to its upper limit of movement. The forces urging the bypass valve assembly to its normal position includes the spring 83 and the pressure of oil in chamber 118 which, being unrestrictedly connected with chamber 78, is 5 pounds. These pressures urge the bypass valve assembly downwardly so that the valve 43 is seated on its seat 36 and the valve 42 is in its wide-open position. The bypass valve assembly is urged in the upward direction by an oil pressure of 3 pounds which is derived from the chamber 79 by way of the passage 116, but obviously this pressure is insufficient to overcome the 5 pounds of oil pressure in chamber 118 and the force of the spring 83. Under normal operating conditions the various parts of the mechanism will remain in the position shown in Figure 2 as long as the pressure differentials across the orifices 95 and 106 remain in balance.

Figure 3:
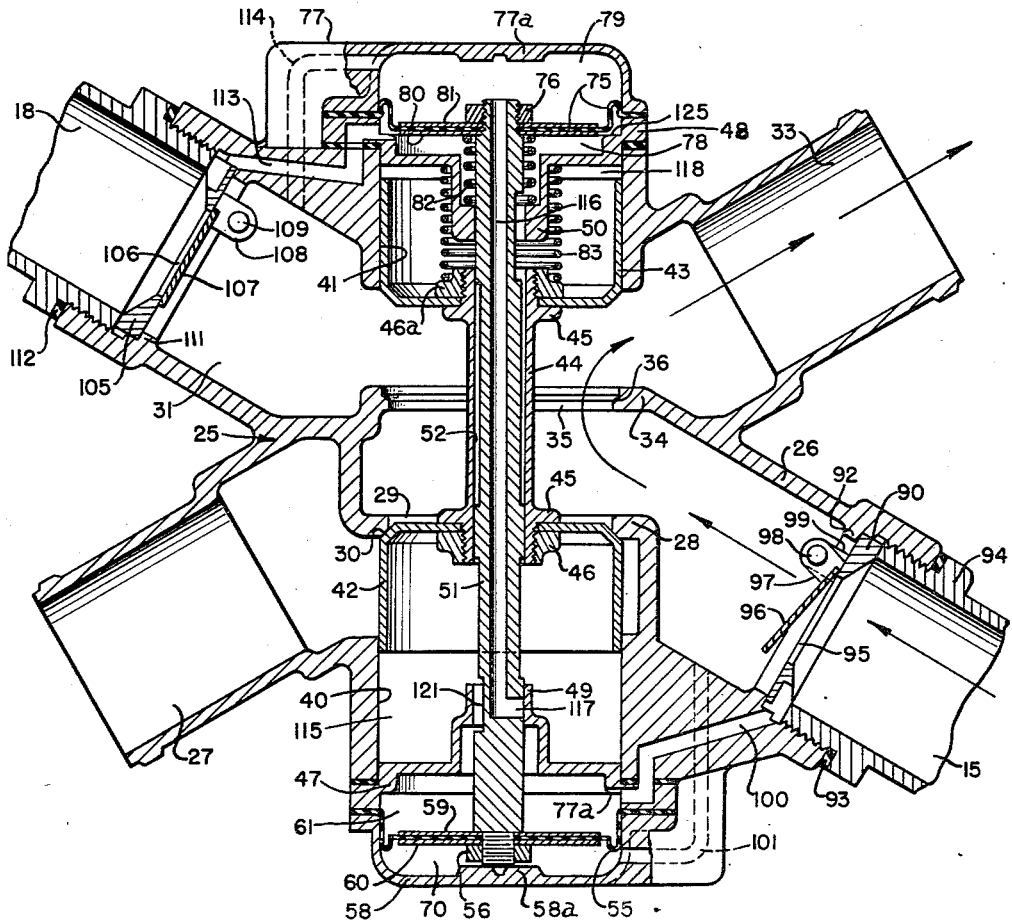
Figure 3 is a diagrammatic view of the same, but showing the respective parts thereof in the operative bypassing position.

Should a leak occur in the cooler or cooler section of the system, the pressure differential across the orifice 106 will drop. Assuming said pressure differential is reduced to 1½ pounds, the ½ pound differential loss will effect an unbalanced condition of the servo-valve assembly to cause downward movement of valve 51 against the force of spring 82 which, by way of example, may be calibrated at ¼ pound. The servo-valve 51 will then assume the position shown in Figure 3, it being noted that the boss 58a limits the downward movement of said valve. The oil pressure in chamber 79 has been reduced below the 3 pounds of pressure normally prevailing therein and the pressures in chambers 78 and 118 are below the normal 5 pound value. With the servo-valve 51 in the position shown in Figure 3, the 15 pounds of pressure in chamber 61 is communicated to chamber 115 by way of the passage now provided between the interior of the guide 49 and the relieved portion 121 of said valve 51. This 15 pounds pressure in chamber 115 is sufficient to overcome the pressure of oil in chamber 118 and the force of spring 83 and effect upward movement of the bypass valve assembly to the position shown in Figure 3 wherein valve 42 closes the port or opening 29 and valve 43 has moved away from its seat 36 to permit the flow of oil through the opening 35. At the same time the check valve 107 is moved to the closed position by the pressure differential on opposite sides thereof, the pressure on the downstream side of valve 107 being substantially greater than that on the opposite side thereof. With the various parts of the device in the position shown in Figure 3, which is the operative position to effect bypassing, oil from the engine flows into the passage 26, through the opening 35, into the annulus 32 and passage 33 from which it is conveyed back to the tank by way of the conduit 19.

From the foregoing it will be obvious that should the cooler be damaged and leak oil, the bypass valve will automatically operate to bypass said cooler and prevent any substantial loss of oil in the engine oiling system. This will insure continued operation of the engine for landing the plane on which the system is installed.

Since the cooler has been damaged, the pressure in the passages 27 and 31 and the pressure in the cooler will drop to substantially atmospheric pressure. Upon stopping of the engine, which will result in a drop in the oil pressure throughout the other portions of the system, the device will reset itself to the original position shown in Fig. 2 within a relatively short period of time, so that when a new cooler is installed the valve will be in the correct normal position, whereat oil will circulate throughout the entire oil circulating system.

If desired, a warning system may be provided for warning the pilot that the bypass valve has moved to the bypassing position. This system may comprise a warning light having an electrical system controlled by a switch located at 126 and which includes a fixed contact 127 and a movable contact member 128 disposed adjacent the free outer end of a lever 129. Intermediate the ends of the lever is a flange 130 having an annular groove 131 therein which receives a doughnut-shaped member 132 which may be of rubber or other suitable resilient insulating material. The lever is normally in a position whereat contacts 127 and 128 are spaced apart and the interior free end of said lever is provided with an annular flange 133 which is adapted to be engaged by the adjacent end wall of the valve 42, and to be moved upwardly thereby when said valve moves to its seating position on seat 30. Actuation of the lever 129 by the valve 42 will effect such movement of the contact 128 as to cause it to engage the contact 127, thereby completing the electrical circuit to the warning light.

I claim:

1. In a fluid control valve: a casing having a pair of passages therethrough, each passage having inlet and outlet portions; a partition separating the inlet and outlet portions of one passage, said partition having an opening therein; a partition between the last mentioned inlet portion and the other passage, said latter partition having an opening therein; valve means adapted to close one opening at a time and normally positioned to close the second mentioned opening; a restriction in said one passage, anterior to the partition therein; a restriction in the inlet portion of the other passage; a check valve for each of said restrictions; a control member for the valve means, said control member being subjected to pressures on opposite sides of the restrictions, said pressures being so applied as to normally exert balanced forces urging said control member in opposite directions; yielding means urging the control member to an inoperative position, said control member being urged to an operative position upon unbalancing of the said balanced forces; and means controlled by the control member and becoming operative when said control member moves to its operative position, for moving the valve means to a position whereat the first mentioned opening is closed and the second mentioned opening is open.

2. In a fluid control valve: a casing having a pair of passages therein each having an inlet portion and an outlet portion; a connection between said passages; flow restricting means in each inlet portion; flow control valve means adapted, when in one position, to close said connection and when in another position to open said connection and shut off communication between the inlet and outlet of one of said passages; pressure responsive means for closing the flow restricting means in the inlet portion of the other passage; and control means subjected to the pressures on opposite sides of the restricting means, said control means being normally positioned in an inoperative position and having an operative position to which it is movable when the pressure differential across the flow restricting means in said other inlet portion is below the pressure differential across the restricting means in said one passage.

3. In a fluid control valve: a casing having a pair of passages therethrough, each passage having an inlet and an outlet; valve means controlling said passages, said valve means being responsive to fluid pressure and having two positions; means in one passage for creating a fluid pressure differential therein; means in the other passage for creating a fluid pressure differential therein, said fluid pressure differentials being normally of substantially the same value; control means for controlling fluid pressure applicable to said valve means, said control means including a control member having two positions and so constituted and arranged as to be subjected to said fluid pressure differentials and to be maintained in a position whereat fluid for actuating said valve means is cut off therefrom when said fluid pressure differentials are of substantially the same value, and to be moved to a position whereat said valve means is subjected to said fluid pressure for actuating the same when the value of one of said pressure differentials varies from the value of the other of said pressure differentials.

4. In a fluid control valve: a casing having a pair of passages therethrough, each passage having an inlet and an outlet; a port within one passage; a port connecting said passages; bypass valve means controlling said ports and having one position at which the first mentioned port is open and the second mentioned port is closed, and a second position whereat the first mentioned port is closed and the second mentioned port is open; means yieldingly urging the valve to said one position; means in the inlet position of one passage for creating a pressure differential therein; means in the inlet portion of the other passage for creating a differential of pressure therein, the value of said pressure differentials being normally substantially the same; a servo control means for controlling the position of the bypass valve means, said servo control means including a pair of movable walls and a servovalve member controlled thereby; means for subjecting the respective sides of one of said movable walls to the pressures on opposite sides of one of the pressure differential creating means; means for subjecting the respective sides of the other movable wall to the pressures on opposite sides of the other pressure differential creating means, the pressures urging the servo-control means in one direction normally being of substantially the same value as those urging it in the opposite direction; and yielding means urging the servo-control means to an inoperative position, said servo-control being movable to an operative position upon unbalancing of said differential pressures for effecting movement of the bypass valve means to the second position.

5. The invention defined by claim 4, wherein the pressure differential creating device in the unported passage includes an orifice and a check valve adapted to be moved to a position closing said orifice when the bypass valve means is in the second position.

6. The invention defined by claim 4, including: means controlled by the servo-valve for effecting a transmission of oil pressure for effecting movement of the bypass valve means to the second position against the force of the first mentioned yielding means.

7. In a fluid control valve for an oil circulating system: a casing having a first passage and a second passage therein, each passage having an inlet portion and an outlet portion; a valve port in one passage; a valve port connecting the passages; a bypass valve controlling said ports and having one position whereat the first mentioned port is open and the second mentioned port is closed, said bypass valve having a second position whereat the first mentioned port is closed and the second mentioned port is open; valve means for controlling the flow of oil through said passages, there being a flow of oil through both passages when the bypass valve is in said one position and a direct oil flow from the first mentioned inlet to the second mentioned outlet when the bypass valve is in said second position; yielding means urging the valve means to said one position; means for creating a differential of pressure in each of the inlet passages, said means being so calibrated that the respective pressure differentials are normally the same; control valve means, subjected to the pressures on opposite sides of the pressure differential creating means for urging the control valve in opposite directions, said pressures being so applied that the force urging the valve means in one direction is normally balanced by the force urging the valve means in the opposite direction; yielding means normally urging the control valve means to an inoperative position, said valve means being adapted to be moved to an operative position when said forces to which it is subjected become unbalanced; and means, controlled by the control valve means, for subjecting the bypass valve to a fluid pressure capable of moving said bypass valve to its second position.

8. A control valve for oil circulating systems, comprising: a casing having a first and second passage therein, each passage having an inlet portion and an outlet portion; means interconnecting said passages; bypass valve means for controlling the flow of oil through said passages, said valve means being so constructed and arranged that when in one position there is a flow of oil between the inlet and outlet portions of the first passage, and there is a flow of oil from the inlet portion to the outlet portion of the second passage, and when in a second position there is a flow of oil from the inlet portion of the first passage to the outlet portion of the second passage; yielding means urging the valve means to said one position; means for creating a differential of pressure in each of said inlet portions, said means being so calibrated that the respective pressure differentials are normally the same; control valve means, including a pair of diaphragms, subjected to the pressures on opposite sides of the pressure differential creating means for urging the valve in opposite directions, said pressures being so applied that the forces urging the control valve means in one direction are normaly balanced with those urging said control valve means in the opposite direction; yielding means normally urging the control valve means to an inoperative position, said control valve means moving to another position when the pressures to which it is subjected become unbalanced; and means, controlled by the control valve means, for subjecting the bypassing valve to an oil pressure in the casing capable of moving said bypass valve to its second position when said control valve means is moved to its last mentioned position.

9. The invention defined by claim 8, wherein there is a relief passage, controlled by the control valve means, to relieve the pressure urging the bypass valve to its second position and allowing said bypass valve to return to said one position.

10. In a fluid flow control device: walls defining a pair of fluid passages, each having an inlet and an outlet; means, including a port, interconnecting said passages; a valve controlling said port and having a first position whereat said port is closed, and a second position whereat said port is open and said valve closes one of said passages so that the fluid flow is from the inlet of one passage to the outlet of the other passage; yielding means urging said valve to the first position; a servo-valve balanced by fluid pressures within the respective passages; and yielding means for urging the servo-valve to an inoperative position, said servo-valve being movable to another position upon unbalancing of said balanced fluid pressures and when said servo-valve is in the last mentioned position fluid pressure is applied to the first mentioned valve to move same to its second position.

11. In a flow control device: walls defining a pair of fluid passages, each having an inlet portion and an outlet portion; means, including a port, interconnecting said passages; a valve controlling said port and having a first position whereat said port is closed, and a second position whereat said port is open and said valve closes one of said passages so that the fluid flow is from the inlet portion of one passage to the outlet portion of the other passage; yielding means urging said valve to the first position; a restricted orifice in each inlet portion of said passages; a servo-valve, said servo-valve being subjected to the differential of pressures across said orifices in such a manner that said valve is balanced by said pressures; yielding means urging the servo valve to an inoperative position, said servo valve being movable to another position upon unbalancing of said differential of pressures and when said servo-valve is in the last mentioned position fluid pressure is applied to the first mentioned valve to move same to its second position.

12. The invention defined by claim 11, wherein said servo-valve controls a passage to relieve the pressure applied to the first mentioned valve for moving same to its first mentioned position, when the pressures applied to the servo valve are again balanced.

13. A control valve for oil circulating systems, comprising: a casing having a first and a second passage therein, each passage having an inlet portion and an outlet portion; means, including a valve port, interconnecting said passages; a wall in one of said passages, said wall having a valve port therein axially aligned with the first mentioned port; a bypass valve including a stem and a pair of valve members spaced axially apart on said stem, said stem being hollow and disposed axially of said ports, said bypass valve having one position whereat the first mentioned valve port is closed and the second mentioned valve port is open and a second position whereat the first mentioned port is open and the second mentioned port is closed; opposed cylindrical bypass valve chambers within which respective valve members are adapted to reciprocate; servo valve means including a servo valve member slidable in the bypass valve stem and having two positions and a diaphragm connected to each end of said servo valve member; walls defining outer and inner chambers on the respective sides of each diaphragm; said servo valve member having passages and ports for controlling the flow of oil between various of said chambers; a restricted orifice in the inlet portion of each of said passages; check valves controlling said orifices; a spring urging the bypass valve to said one position; a spring urging the servo valve to one of its positions whereat one of the cylindrical chambers is connected with the chamber on the outer side of the diaphragm opposite said cylindrical chamber; and passage means interconnecting one of the passages on opposite sides of the restricted orifice therein with the respective chambers on opposite sides of one of the diaphragms and interconnecting the chambers on opposite sides of the other diaphragm with the other passage on opposite sides of the restricted orifice therein, the pressures on opposite sides of said diaphragms being such that said servo valve member is balanced by said pressures, and maintained in its spring urged position as long as said pressures balance said servo valve means, said servo valve member being movable to another position, upon unbalancing of said pressures, whereat fluid pressure is transmitted to one of the bypass valve chambers to urge said bypass valve to its second position.

RAYMOND W. JENSEN.

REFERENCES CITED

The following references are of record in the file of this patent:

UNITED STATES PATENTS

| Number | Name | Date |
| --- | --- | --- |
| 2,027,762 | Becker | Jan. 14, 1936 |
| 2,336,480 | Grantz | Dec. 14, 1943 |
| 2,404,936 | Wills | July 30, 1946 |

FOREIGN PATENTS

| Number | Country | Date |
| --- | --- | --- |
| 669,897 | France | Aug. 12, 1929 |